F. CLARK.
Saw Guides.
No. 201,498. Patented March 19, 1878.
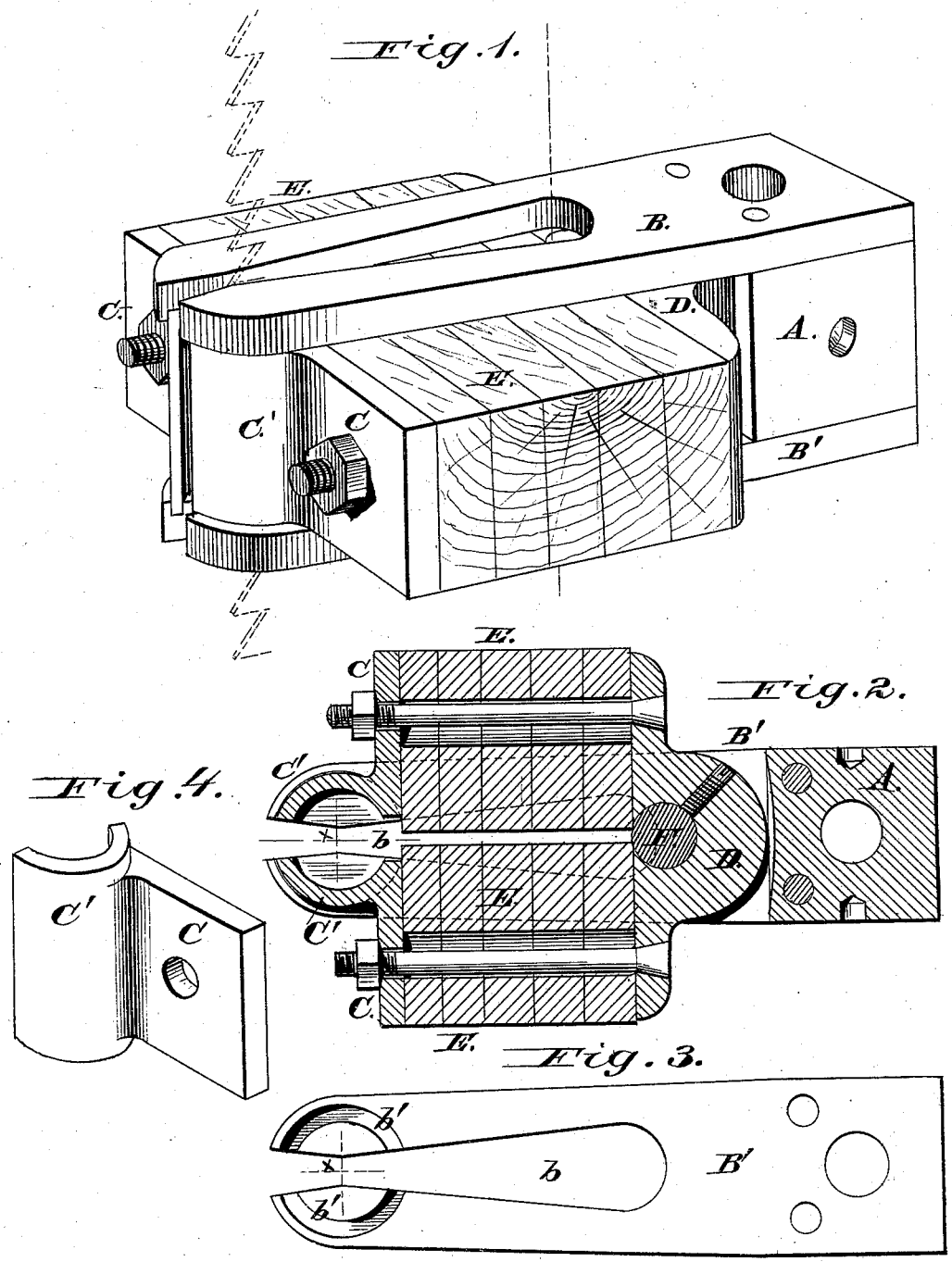

UNITED STATES PATENT OFFICE.

FRANCIS CLARK, OF SPRINGFIELD, MISSOURI, ASSIGNOR TO J. A. FAY & CO., OF CINCINNATI, OHIO.

IMPROVEMENT IN SAW-GUIDES.

Specification forming part of Letters Patent No. 201,498, dated March 19, 1878; application filed December 3, 1877.

*To all whom it may concern:*

Be it known that I, FRANCIS CLARK, of Springfield, in the county of Green and State of Missouri, have invented a certain new and useful Improvement in Saw-Guides, of which the following is a full, clear, and exact description:

This invention relates to saw-guides so constructed and applied as to maintain the direction of the saw in line with the guiding or feeding rolls, and to prevent any deviation from the determined direction or path of the saw at the line of the points of its teeth.

My improvement consists of a loosely-swinging guide pivoted to its holder in such way that the line of the teeth of the saw-blade will be coincident with the axis around which the guide swings.

The self-adjusting character of the guide provides for the undulating motions of the saw-blade occurring in sawing stuff of uneven thickness, and in sawing in curved lines without at all affecting the determined line of the cut, which will be maintained by the guide in the true direction throughout. The "running" of the saw of band-saw mills, for which this saw-guide is more especially intended, is also prevented by the self-adjusting character of the guide, because the friction on the saw is thereby reduced to a minimum. The uneven wearing away of the guide—that is, wearing more near the front of the saw-blade than near the back—is thus also provided against.

My improvement further consists of minor points of construction which will be clearly set forth in the ensuing description, and specially pointed out in the claims at the conclusion of the specification.

In the annexed drawings, Figure 1 is a perspective view of my improved saw-guide. Fig. 2 is a horizontal section thereof. Fig. 3 is a plan view of one of the jaws of the holder. Fig. 4 is a perspective view of one of the pivot-plates.

The same letters of reference indicate like parts in all of the figures.

The holder by which the guide proper is supported on a suitable arm or standard of the sawing-machine consists of a block, A, and two plates, B and B', which are rigidly connected to the respective ends of the block, and extend forward therefrom so as to form jaws. These plates or jaws are formed with long tapering slots $b$, which extend from their extreme outer ends inward, and are preferably shaped substantially as shown.

Annular grooves $b'$, the continuity of which is only interrupted by these slots $b$, are formed in the opposing inner faces of the jaws near their extreme outer ends. These annular grooves receive the journal ends $C'$ of the pivot-plates C of the guide. Said journal ends are segments of a true hollow cylinder, fitting the annular grooves so that they can turn therein. When confined between the jaws of the holder, a suitable space intervenes between the segmental journal ends for the play of the saw between their opposing faces, as shown clearly in Fig. 2. There will be sufficient friction between the journals and their bearings to hold the guide reasonably steady, so as to prevent trembling vibrations of the saw. The pivot-plates constitute the front of the guide.

D refers to the back, between which and the pivot-plates the cheeks E, which support the saw-blade on its sides, are secured by bolts, as best shown in Fig. 2. Each cheek E is preferably made of several plates of wood or other non-frictional material, so that by removing or adding plates the depth of the guide may be adapted to the width of the saw-blade. The cheeks are slotted where the bolts pass through them, so that they may be laterally adjusted to accommodate saw-blades of different thicknesses, and to compensate for wear. The back D of the guide contains a circular adjustable vertical steel cylinder, F, to support the back of the saw-blade and receive the back thrust. Other well-known means may be used to support the back of the saw, such as a straight piece of steel or an anti-friction wheel.

In applying this guide it must be so adjusted that the points of the teeth of the saw will be coincident, or nearly so, with the axis of the pivot-plates of the guide, the location of which is indicated by the point $x$ in Figs. 2 and 3. As the guide moves around this axis, it follows that lateral motions of the saw-blade will not affect the determined direction of the cut.

It should be understood that the mode shown and described of pivoting the guide may be greatly varied in the details of construction without departing from the principle of my invention, which will be involved whenever the guide is hung to swing loosely, when in operation, around an axis coincident with the line of the saw-teeth.

What I claim as my invention, and desire to secure by Letters Patent, is—

1. A saw-guide self-adjusting when in operation, and pivoted or hung at the front with its axis in the plane of the saw-slit, so that the axis around which the guide moves in adjusting itself when in use on a machine will be coincident with or near the line of the front of the saw-blade, substantially as and for the purpose specified.

2. The combination, substantially as specified, of the holder having slotted and annularly-grooved jaws and the guide provided at the front with segmental journals adapted to and turning in the annular grooves of the said jaws.

In testimony whereof I have signed my name to the foregoing specification in the presence of two subscribing witnesses.

FRANCIS CLARK.

Witnesses:
G. L. BULKLEY,
T. D. WILLIAMS.